July 19, 1927.

E. EDWARDS ET AL 1,636,466

APPARATUS FOR MAKING WIRE HEMP OR OTHER ROPES, CABLES, AND THE LIKE

Filed June 28, 1926      5 Sheets-Sheet 3

Inventors:-
Edwin Edwards.
Charles Jones
Robert Hansen
By Sturtevant
attys.

July 19, 1927.　　　E. EDWARDS ET AL　　　1,636,466
APPARATUS FOR MAKING WIRE HEMP OR OTHER ROPES, CABLES, AND THE LIKE
Filed June 28, 1926　　5 Sheets-Sheet 4

Inventors:-
Edwin Edwards.
Charles Jones and
Robert Hanson
By Hunter and Husson
atty.

July 19, 1927.  E. EDWARDS ET AL  1,636,466
APPARATUS FOR MAKING WIRE HEMP OR OTHER ROPES, CABLES, AND THE LIKE
Filed June 28, 1926   5 Sheets-Sheet 5
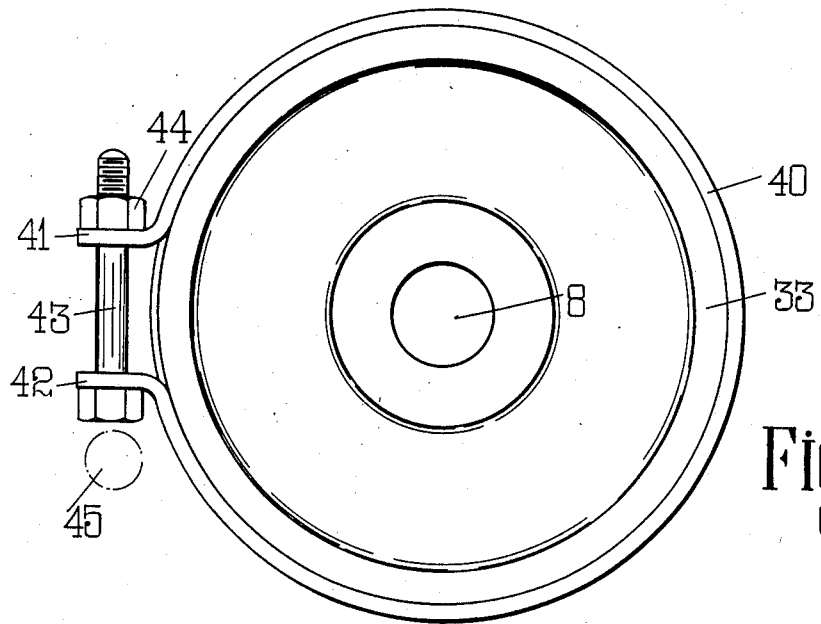
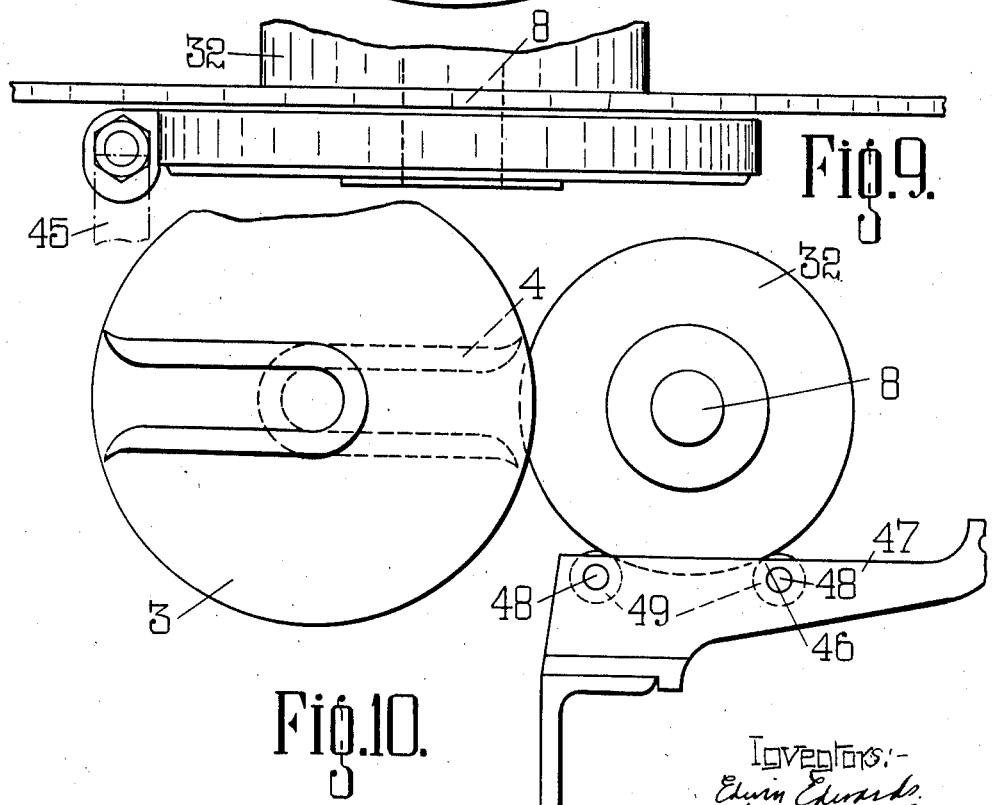

Patented July 19, 1927.

1,636,466

UNITED STATES PATENT OFFICE.

EDWIN EDWARDS, CHARLES JONES, AND ROBERT HANSON, OF WARRINGTON, ENGLAND.

APPARATUS FOR MAKING WIRE, HEMP, OR OTHER ROPES, CABLES, AND THE LIKE.

Application filed June 28, 1926, Serial No. 119,097, and in Great Britain July 2, 1925.

This invention relates to machines for making wire, hemp and other ropes, cables and the like of the type in which bobbins are supported in a rotating tubular frame and strands drawn from said bobbins to one end of the machine where they are twisted to form a rope or the like.

An object of the invention is to construct a machine which will occupy considerably less floor space than those hitherto used.

A further object of the invention is to provide a machine wherein diametral supports for the frames carry opposite ends of adjacent bobbin carriers.

A still further object of the invention is to allow for removal of stationary bobbin carriers mounted in the rotatable frame without adjustment of the axial separation of diametral supports forming part of said frame and carrying said bobbin carriers.

Another object of the invention is to form a tubular frame wherein the constituent members are secured together without the use of bolts.

In the construction of the present invention the tubular frame comprises two or more longitudinally extending steel plates interconnected by spaced disc like supports welded to the plates, housing being fitted to said discs for supporting bobbin carriers.

A further feature of the invention resides in the provision of supporting members integrally fitted with a housing carrying a bearing for a bobbin carrier, the bearing being offset from the plane of the support.

Each support carries bearings for the opposite ends of adjacent bobbin carriers in order to save considerable space in the over all length of the machine. Further, in order to allow of rapid removal of the bobbin carrier a movable member is provided on the offset bearing which holds the carrier in the bearings and is adapted on movement from its operative position, to allow the removal of the carrier.

The nose end of the machine may be formed integrally with the longitudinal plates or the plates forming the nose end may be separate and welded to the longitudinal plates preferably by shrinking a solid band or tyre over the longitudinal plates then fitting the nose end, welding all three together.

The opposite end is completed by a dished or flanged end fitting over the longitudinal plates and welded thereto. The band and dished end form the bearing sleeves for the machine. The housings may be formed as guide ways rigidly secured to the disc and carrying the bobbin spindles co-axially with the discs or the housing is formed with an offset bearing supporting the floating carrier.

In the latter case the carrier frame is provided with a swivelling spindle pivoting about an axis at right angles to the axis of the tubular frame to facilitate mounting of the bobbin.

The invention is more particularly described with reference to the accompanying drawings, in which:—

Figures 8 and 9 show in elevation and plan view, one form of brake applied to the construction shown in Figures 1–6.

Figure 10 is a detail.

Figure 1:
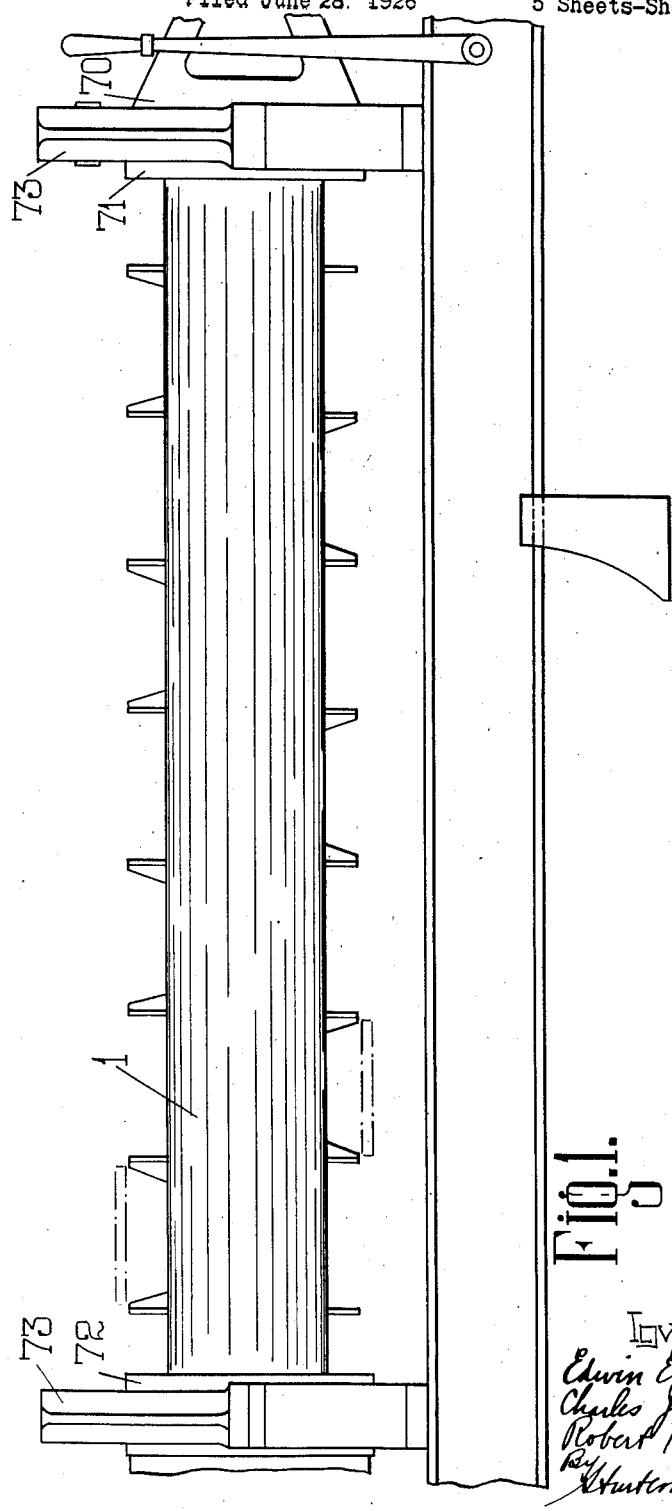
Figure 1 is a front elevation of the tubular part of the machine.
Figure 2:
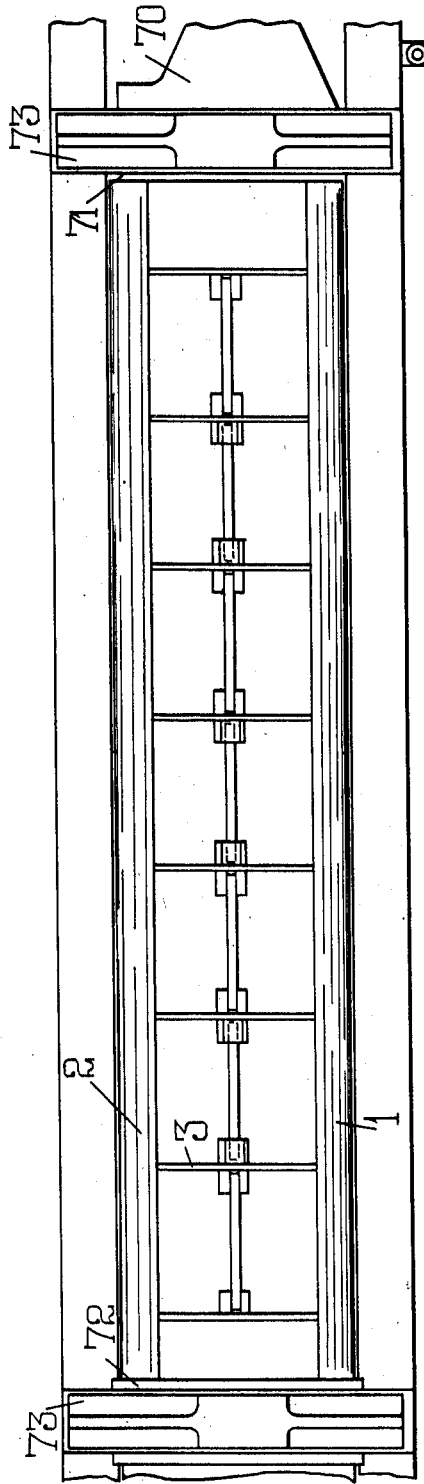
Figure 2 is a corresponding plan view.
Figure 3:
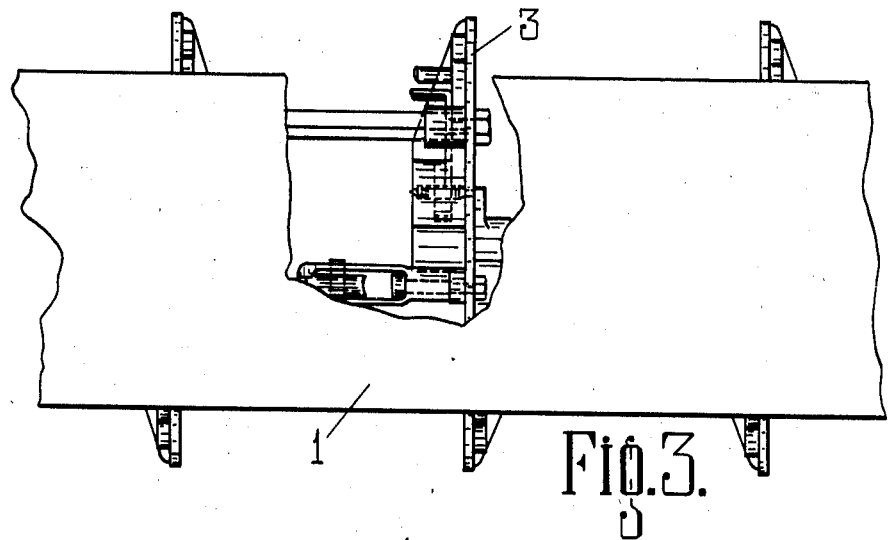
Figure 3 is a front elevation of a part of the machine with part of the outer casing of the tube cut away.

Referring to the drawings, the machine comprises a tubular casing composed of oppositely arranged cylindrical segments 1, 2, which are interconnected by a plurality of spaced discs 3 which may be welded or otherwise secured to the segments 1, 2. The tubular frame composed of the segments and spaced discs is connected with a driven shaft (not shown) arranged on the left hand end of the machine shown in Figures 1 and 2.

The nose end 70 of the machine is either formed integrally with the longitudinal plates 1, 2, or else formed separately and welded thereto and to a steel band 71 shrunk over and welded to the longitudinal plates 1, 2.

The other end of the machine is provided with a brake band comprising a dished end 72 fitting over and welded to the longitudinal plates 1, 2. The band 71 and dished end 72 form the runners for the frame supported by the roller or like bearings 73.

The axial spacing of the discs 3 is such as to receive a bobbin freely mounted on a spindle. The discs 3 are provided on each face with guide-ways 4 which are secured by bolts or the like 5 to the discs, the guide-ways being of substantial U-shape and adapted to support the spindle of the bobbin coaxially with the disc. Each disc is provided with a guide-way on each side thereof, the guide-ways being oppositely disposed relatively to the centre for the sake of balance.

The guide-way 4 is formed with raised edges 6 and a central groove 7 within which the spindle 8 of the bobbin slides. The spindle 8 on which the bobbin is freely mounted is retained in position by a locking device which comprises a cam 9 pivoted at the point 10 and having a pin 11 engaging in a slot 12 formed in the arm 13 of a lever pivoted at 14 and provided with an arm 15 carrying a weight 16 and a further arm 17. The arm 17 is preferably provided with a handle 18.

Figure 4:
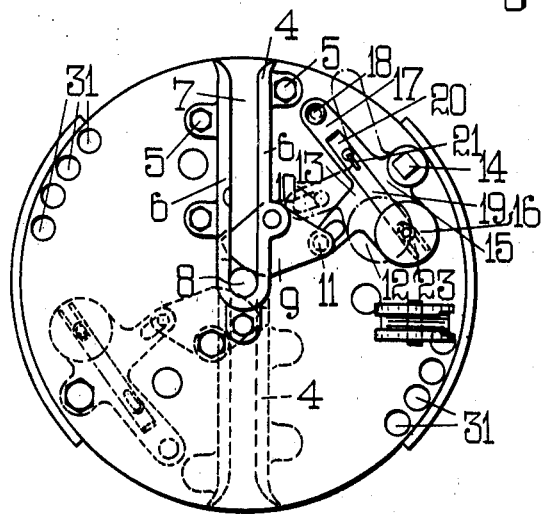
Figure 4 is a front elevation of one of the discs of the frame and accessory parts.
Figure 5:
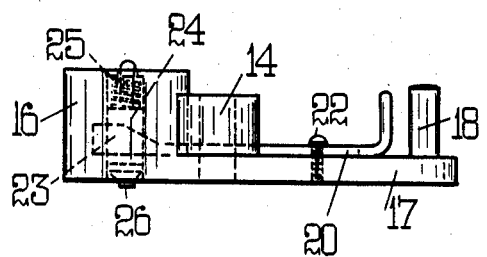
Figure 5 is an enlarged detail of the centrifugal locking device.

When it is desired to insert a bobbin within the slide 7 of the guide-way 4, the lever is moved to the position shown in chain dotted lines in Figure 4 when the engagement of the pin 11 and slot 12 rotates the cam 9 about its axis 10 to allow a clear way within the slide 7. When the machine is rotating rapidly the weight 16 tends to move under the action of centrifugal force in a substantially radial direction thus causing the arm 13 of the pivot to move from the dotted position to the position shown in full lines, thus causing, by means of the slot 12 and pin 11, the cam 9 to take up its position shown in full in Figure 4 and hold the spindle 8 firmly in position. In order to prevent the bobbin on its spindle 8 dropping out of the slide way 7 when the machine is rotating slowly, a hand actuated catch member 19 is provided on the upper surface of the weighted lever. This comprises a slide bar 20 slotted as shown at 21 and adapted to embrace therewith a stud or the like 22 screwed into the arm 17 of the weighted lever. The slide bar 20 extends within a hollow portion of the weight 16 and is formed with a forked cam shaped end 23. A stud 24 actuated by a spring 25 is adapted to extend axially of the weight 16 with its end 26 engaging in a hole (not shown) formed in the disc 3. The stud 24 is further formed with cam surfaces cooperating with the surfaces on the end 23 of the slide bar 20 so that movement of the stud 24 and consequent engagement or disengagement of the stud 24 in the hole in the disc 3.

Figures 6, 11, 12:
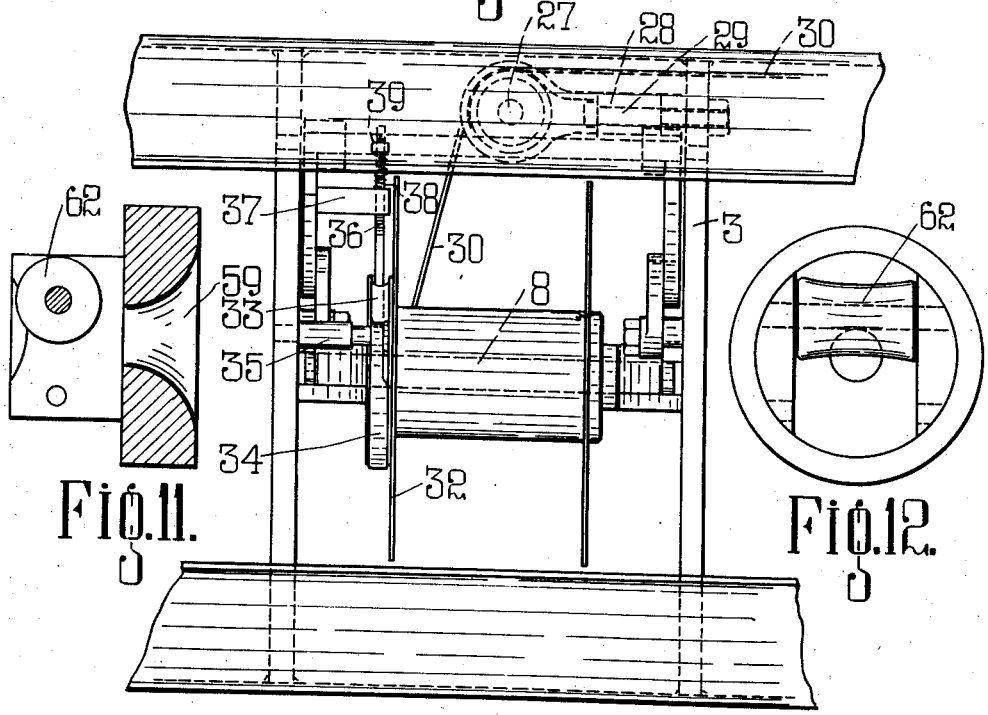
Figure 6 is a plan view of part of the frame corresponding to Figure 3.
Figures 11 and 12 are side and front elevations respectively of a combined guide eye and guide roller.

As shown in Figure 6 the strand 30 of the bobbin is taken off substantially radially of the tubular frame over a pulley 27 provided with a hollow shank 28 through which extends a bolt 29 secured to the disc 3. The pulley shank 28 is freely mounted on the bolt 29 so that the pulley may rotate about the axis of the bolt 29. The strand 30 is then passed through one or other of a plurality of holes 31 arranged in the disc 3 and through each succeeding disc until it reaches the winding end of the machine.

In order to prevent free rotation of the bobbin 32 on the spindle 8, the bobbin is provided with a brake pulley 33 mounted at one end thereof round which engages a brake 34 comprising a band of leather or other suitable material if necessary mounted on a metal strip which is secured at one end to a pin 35 and at the other end is formed with a threaded shank 36 extending freely through a hole formed in a lug 37 secured to the disc 3 and provided with a spring 38 between the lug 37 and an adjustable nut 39. In this manner the tension of the brake band 34 on the brake pulley 33 may be regulated.

An alternative simple brake is shown in Figures 8 and 9 and consists of a brake pulley 34 around which is freely mounted a brake band 40 the two ends 41, 42 of which are secured by a bolt 43 and nut 44. The pressure of the band 40 on the pulley 34 is regulated by adjustment of the nut 44 and the band is held from rotation relatively to the disc 3 by an abutment member 45 projecting from the disc 3 so that the rotation of the bobbin 32 on its axis 8 due to the pull of the strand being unwound may be adjustably braked.

As hereinbefore mentioned the guide members 4 on opposite sides of each disc are disposed oppositely of the axis so that adjacent bobbins will be introduced into the tubular frame from opposite sides of the machine or alternatively half the bobbins will be introduced and the machine rotated through 180° to allow introduction of the remaining bobbins. As shown in Figure 10 to facilitate loading, a loading frame 46 comprising frame members 47 disposed at opposite ends of the machine and carrying rods 48 forming axes for rollers 49, is arranged along the length of the machine, the bobbins resting by their flanged ends on the rollers 49 with their spindles 8 in alignment with the guide members 4.

In the operation of this device the bobbins 32 are mounted on the loading frame 46 and are introduced into the machine after movement of the weighted lever to cause the cam 9 to leave the slide-ways 7 clear. On the insertion of the bobbins the weighted lever is adjusted to its operative position and the catch stud 24 is introduced into the hole in the disc 3 by operation of the slide bar 20. The machine is then rotated through 180° and the remaining bobbins mounted therein and the corresponding weighted levers secured temporarily in operative position. On rotation of the machine the weighted levers will retain their operative position owing to the action of centrifugal force and the spindles 8 of the bobbins will remain cc axial with the tubular frame by means of the cams 9.

Figure 7:
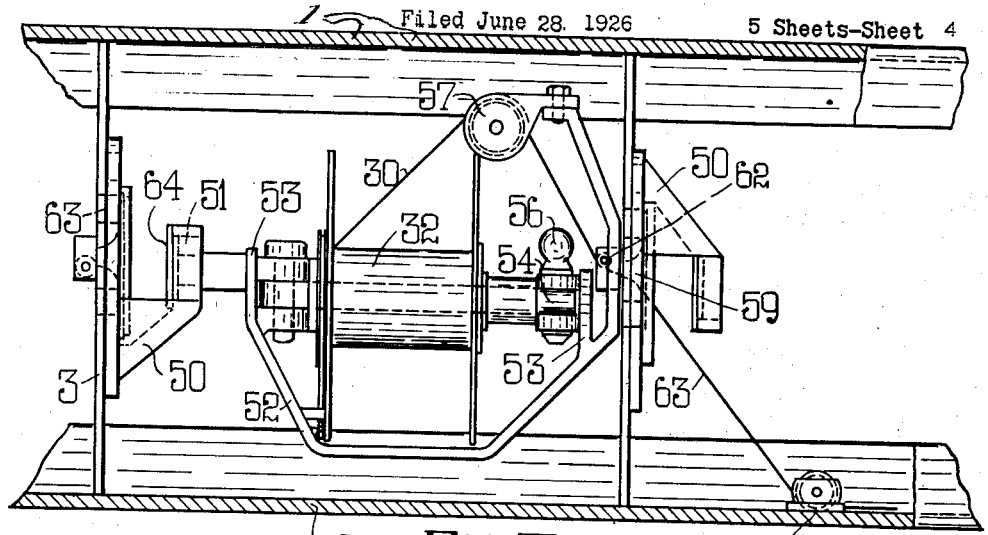
Figure 7 is a longitudinal section of a modified form of construction.

The strand 30 will be withdrawn from the bobbins 32 in the usual manner at the front end of the machine and will cause the bobbin to rotate slightly according to the lay off relatively to the rotating tubular frame, the free movement of the bobbin being regulated by the brake. In the construction shown in Figure 7 to the discs 3 interconnecting the segmental members 1, 2, are integrally secured housings 50 carrying a ball or roller bearing 51 offset from the plane of the disc 3 supporting a carrier frame 52 axially of the tubular frame. The carrier frame 52 is provided with lug members 53 acting as supports for a bobbin receiving pin 54 which is adapted to pivot about a pin 55 and to be clamped in position on the opposite lug 53 by a further pin 56.

To the opposite end of the carrier frame 52 is secured a guide eye 59 in front of which is mounted a roller or pulley 62 see Figures 11 and 12. The guide eye 59 is supported in an axial recess 63 in the disc 3 and inner face of the housing 50 located on the opposite side of the disc 3 with interposition of a roller or like bearing not shown.

The bobbin is thus mounted on the axis pin 54 when the latter is swung from its position parallel to the axis of the tubular frame and is secured in its parallel position by the pin 56. The strand 30 is taken off substantially radially of the tubular frame on to a pulley 57 mounted on an additional arm 58 of the carrier frame whence it passes with interposition of pulley 62 through the rotatable guide eye 59 and thence to pulleys 61 mounted on the cylindrical segment 1 or 2. The bobbin 32 is provided with a brake member similar to that shown in Figure 6, the supporting means for the brake being mounted on the carrier frame.

The offset bearing 51 is provided with a movable member which holds the frame 52 in position in its bearings. In the drawings a plate 64 is shown which is secured by screws (not shown), so that on movement of the plate 64 the carrier may be moved axially to the left to disengage the eye 59 from the bearing and on removal of that part of the bearing 51 secured to the frame 52 the latter may be moved axially to the right and thus disengaged from the disc and housing.

As shown in Figures 11 and 12 the pulley 62 is located adjacent the flared guide eye 59 with its periphery lying substantially on the centre of the eye so as to guide the thread without undue torsion.

In the operation of this device, the carrier frame will remain stationary by its weight on rotation of the tubular frame, the bobbin also remaining stationary except for its slight rotation caused by the lay off of the strand 30. The provision of the guide eye allow roving of the strand without undue torsion.

We declare that what we claim is:—

1. In a machine for making all kinds of ropes, a tubular frame adapted to carry bobbins comprising at least two plates extending longitudinally of said frame, spaced supports integrally connected to said plates, housings integrally fitted to said supports, bearings located in said housings, bobbin carriers mounted in said bearings, a pivot pin in each of said carriers at right angles to the axis of said tubular frame, a spindle pivoting on said pin and means to secure said spindle in operative position.

2. In a machine for making all kinds of ropes, a tubular frame adapted to carry bobbins comprising at least two plates extending longitudinally of said frame, spaced supports integrally connected to said plates, housings integrally fitted to said supports, bearings located in said housings, bobbin carriers mounted in said bearings, a pivot pin in each of said carriers at right angles to the axis of said tubular frame, a spindle pivoting on said pin, said spindle having a slotted end, an apertured lug mounted on said carrier and a locking pin engaging in said slot and said aperture to hold the spindle in operative position.

3. In a machine for making all kinds of ropes, a tubular frame adapted to carry bobbins comprising at least two plates extending longitudinally of said frame, spaced supports welded to said plates, housings integrally fitted to said supports, bearings located in said housings, bobbin carriers mounted in said bearings, a guide eye mounted on said carrier radially of said spindle, a rotatable eye co-axial with said frame and a guide eye located adjacent to and rotating with said plates.

4. In a machine for making all kinds of ropes, a tubular frame adapted to carry bobbins comprising at least two plates extending longitudinally of said frame, spaced supports integrally connected to said plates, housings integrally fitted to said supports, bearings located in said housings, bobbin carriers mounted in said bearings, a pivot pin in each of said carriers at right angles to the axis of said tubular frame, a spindle pivoting on said pin, means to secure said spindle in operative position and means mounted on said carrier to brake the movement of said bobbin relatively to said carrier.

5. In a machine for manufacturing all kinds of ropes, a tubular frame adapted to carry bobbins comprising at least two plates extending longitudinally of said frame, spaced supports welded to said plates, housings integrally fitted to said supports for carrying said bobbins and a loading frame arranged longitudinally of said tubular frame.

In witness whereof, we have hereunto signed our names this 17th day of June 1926.

EDWIN EDWARDS.
CHARLES JONES.
ROBERT HANSON.